(12) United States Patent
Zhang et al.

(10) Patent No.: US 12,508,650 B2
(45) Date of Patent: Dec. 30, 2025

(54) POLYCRYSTALLINE DIAMOND COMPOSITE SHEET HAVING CONTINUOUS GRADIENT TRANSITION LAYER AND PREPARATION METHOD THEREOF

(71) Applicants: CENTRAL SOUTH UNIVERSITY, Changsha (CN); SF DIAMOND CO., LTD., Zhengzhou (CN)

(72) Inventors: Shaohe Zhang, Changsha (CN); Xiangwang Kong, Changsha (CN); Dongpeng Zhao, Zhengzhou (CN); Yulu Li, Changsha (CN); Linglong Rong, Changsha (CN); Haoyang Zhang, Changsha (CN); Qingyuan Fang, Zhengzhou (CN); Hua Gao, Zhengzhou (CN); Jincheng Li, Zhengzhou (CN); Jingjing Wu, Changsha (CN); Mengyao Shao, Zhengzhou (CN); Changjian Geng, Zhengzhou (CN)

(73) Assignees: CENTRAL SOUTH UNIVERSITY, Changsha (CN); SF DIAMOND CO., LTD., Zhengzhou (CN)

( * ) Notice: Subject to any disclaimer, the term of this patent is extended or adjusted under 35 U.S.C. 154(b) by 3 days.

(21) Appl. No.: 18/604,434

(22) Filed: Mar. 13, 2024

(65) Prior Publication Data

US 2025/0100049 A1   Mar. 27, 2025

(30) Foreign Application Priority Data

Sep. 25, 2023 (CN) .......................... 202311236734.5

(51) Int. Cl.
*B22F 7/02* (2006.01)
*B22F 10/32* (2021.01)
(Continued)

(52) U.S. Cl.
CPC ................ *B22F 7/02* (2013.01); *B22F 10/32* (2021.01); *B28B 1/001* (2013.01); *C04B 35/52* (2013.01);
(Continued)

(58) Field of Classification Search
CPC ............ B28B 1/001; C04B 2235/6026; B29C 64/336; B29C 64/321; B22F 10/18
See application file for complete search history.

(56) References Cited

U.S. PATENT DOCUMENTS

| | | | |
|---|---|---|---|
| 4,604,106 A * | 8/1986 | Hall ........................ | E21B 4/003 51/293 |
| 2017/0107764 A1* | 4/2017 | Cook, III .................. | B22F 1/05 |

(Continued)

FOREIGN PATENT DOCUMENTS

| | | | | |
|---|---|---|---|---|
| CA | 2996031 A1 * | 2/2016 | ............. | B65H 57/12 |
| CN | 114515833 A * | 5/2022 | ............. | B33Y 80/00 |

(Continued)

OTHER PUBLICATIONS

CN-114515833-A (Zhang) May 20, 2022 (English language translation). [online] [retrieved Jul. 24, 2025]. Retrieved from: Espacenet. (Year: 2022).*

*Primary Examiner* — Erin Snelting
(74) *Attorney, Agent, or Firm* — JCIPRNET

(57) ABSTRACT

The disclosure discloses a polycrystalline diamond composite sheet having a continuous gradient transition layer and a 3D printing preparation method thereof. The polycrystalline diamond composite sheet consists of a polycrystalline diamond layer, a continuous gradient transition layer, and a cemented carbide substrate from top to bottom, in which the continuous gradient transition layer consists of diamond and cemented carbide. Along a direction from the cemented carbide substrate to the polycrystalline diamond layer, a content of the cemented carbide in the continuous gradient (Continued)

transition layer decreases from 100% to 0, and a content of the diamond increases from 0 to 100%. By designing and combining the continuous gradient transition layer with 3D printing technology, the disclosure realizes a continuous change in the two materials of diamond and cemented carbide, thereby eliminating the sudden change interface of the materials inside the diamond composite sheet.

6 Claims, 1 Drawing Sheet

(51) Int. Cl.
  B28B 1/00 (2006.01)
  C04B 35/52 (2006.01)
  C04B 35/56 (2006.01)
  C04B 35/645 (2006.01)
(52) U.S. Cl.
  CPC ............ C04B 35/56 (2013.01); C04B 35/645 (2013.01); *B22F 2201/20* (2013.01); *B22F 2203/11* (2013.01); *B22F 2207/15* (2013.01); *B22F 2302/10* (2013.01); *B22F 2302/406* (2013.01); *B22F 2303/40* (2013.01); *C04B 2235/3847* (2013.01); *C04B 2235/427* (2013.01)

(56) References Cited

U.S. PATENT DOCUMENTS

| | | | |
|---|---|---|---|
| 2018/0087134 A1* | 3/2018 | Chang | ................. B22F 7/06 |
| 2019/0070845 A1* | 3/2019 | Chang | ................. B33Y 70/00 |
| 2020/0369019 A1* | 11/2020 | Daute | ............. C04B 35/63456 |
| 2021/0147665 A1* | 5/2021 | Reidy | ................. B22F 10/18 |
| 2023/0013537 A1* | 1/2023 | Viswanadham | ...... C04B 35/645 |
| 2024/0165879 A1* | 5/2024 | Tamayol | ................ B33Y 70/00 |

FOREIGN PATENT DOCUMENTS

| | | | | |
|---|---|---|---|---|
| WO | WO-2020177976 A1 * | 9/2020 | ......... | C22C 33/0278 |
| WO | WO-2023003967 A1 * | 1/2023 | ....... | B29D 11/00355 |

* cited by examiner

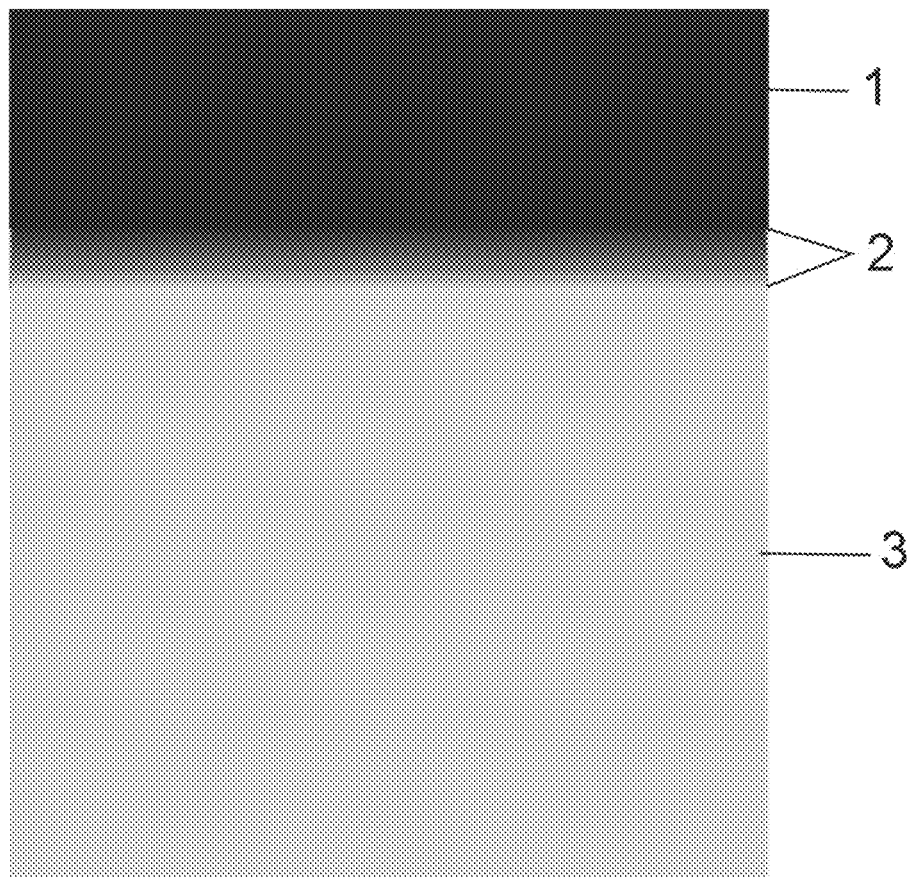

POLYCRYSTALLINE DIAMOND COMPOSITE SHEET HAVING CONTINUOUS GRADIENT TRANSITION LAYER AND PREPARATION METHOD THEREOF

CROSS-REFERENCE TO RELATED APPLICATION

This application claims the priority benefit of China application serial no. CN 202311236734.5, filed on Sep. 25, 2023. The entirety of the above-mentioned patent application is hereby incorporated by reference herein and made a part of this specification.

BACKGROUND

Technical Field

The disclosure relates to the field of polycrystalline superhard material preparation, and in particular to a polycrystalline diamond composite sheet having a continuous gradient transition layer and a preparation method thereof by using 3D printing.

Description of Related Art

The polycrystalline diamond composite sheet (PDC) is widely used in cutting tools, oil drill bits, non-ferrous metal material processing and other fields because it combines the high hardness of diamond with the excellent toughness of cemented carbide. However, due to the large difference in thermal expansion coefficients between diamond and cemented carbide, it is easy for the polycrystalline diamond layer to peel off at the boundary between the two materials during work, and the key reason is that there is an interface with a sudden change in physical properties between the cemented carbide substrate and the polycrystalline diamond layer. This sudden change in material composition often leads to significant local stress concentration, which easily causes damage at the sudden change interface. Functionally graded materials can realize stepwise changes in material components in space. When the functionally graded materials are used in the fabrication of the polycrystalline diamond composite sheet, continuous gradient changes in components can be used instead of the sudden change interface to eliminate the sudden change in physical properties, thereby minimizing the stress between layers inside the polycrystalline diamond composite sheet, and the structure and overall performance are optimized.

The advantage of using the powder spreading method or the ordinary layer-by-layer stacking 3D printing method to prepare the gradient structure diamond composite sheet is that the composition of the powder material is easy to control. However, since the proportion of each component in the mixed powder has to be pre-designed and fully mixed and cannot be adjusted in real time, it is difficult to achieve continuous and uniform changes in the internal components of the functionally graded materials. Therefore, it is hard for conventional manufacturing technologies with long preparation cycles and complex processes to meet the rapid preparation requirements for functionally graded materials that can be customized and whose materials continuously change, a more flexible and efficient manufacturing technology is needed to realize the manufacturing of the polycrystalline diamond composite sheet having the continuous gradient transition layer, so as to minimize the internal residual stress of the diamond composite sheet.

SUMMARY

In order to overcome the shortcomings of the existing technology, the first purpose of the disclosure is to provide a polycrystalline diamond composite sheet having a continuous gradient transition layer. The polycrystalline diamond composite sheet provided by the disclosure is disposed with the continuous gradient transition layer located between a cemented carbide substrate and a polycrystalline diamond layer, which can reduce the residual stress between the cemented carbide substrate and the polycrystalline diamond layer, thereby increasing the bonding strength at the interface between the two materials, and the service life of the polycrystalline diamond composite sheet is improved.

The second purpose of the disclosure is to provide a preparation method by using 3D printing for a polycrystalline diamond composite sheet having a continuous gradient transition layer. Through this process, the continuous change of diamond and cemented carbide materials can be realized, and the fabrication of the continuous gradient transition layer can be completed. The process can not only reduce the difficulty of manufacturing the continuous gradient material, but also the overall performance of the product can be optimized.

In order to achieve the above purposes, the disclosure adopts technical solutions as the following.

The disclosure provides a polycrystalline diamond composite sheet having a continuous gradient transition layer. The polycrystalline diamond composite sheet consists of a polycrystalline diamond layer, a continuous gradient transition layer, and a cemented carbide substrate from top to bottom, in which the continuous gradient transition layer consists of diamond and cemented carbide. Along a direction from the cemented carbide substrate to the polycrystalline diamond layer, a content of the cemented carbide in the continuous gradient transition layer decreases from 100% to 0, and a content of the diamond increases from 0 to 100%.

The disclosure provides the polycrystalline diamond composite sheet having the continuous gradient transition layer. In the polycrystalline diamond layer, the content of diamond is 100%, and in the cemented carbide substrate, the content of the cemented carbide component is 100%. The continuous gradient transition layer consists of diamond and cemented carbide. Along the direction from the cemented carbide substrate to the polycrystalline diamond layer, the content of cemented carbide in the continuous gradient transition layer decreases from 100% to 0, and the content of diamond increases from 0 to 100%. Through continuously changing the ratio of diamond to cemented carbide, the sudden change interface between the polycrystalline diamond layer and the cemented carbide substrate is eliminated, thereby a heterogeneous material whose performance changes gradually with the gradual change of material composition and structure is obtained, which effectively reduces the residual stress at the interface between the two materials, and the performance and service life thereof is improved.

In a preferred solution, the cemented carbide is WC—Co, in which a mass fraction of Co is 3 to 20%, and a mass fraction of WC is 80% to 97%, more preferably, in which the mass fraction of Co is 10 to 20%, and the mass fraction of WC is 80% to 90%.

In a preferred solution, a thickness of the continuous gradient transition layer is 0.1 mm to 3 mm, and the thickness of the continuous gradient transition layer is preferably 0.5 to 1 mm. Through controlling the thickness of the continuous gradient transition layer within the above range, the performance is optimized. If the continuous gradient transition layer is too thin, the material transition interval is small, then the residual stress inside the diamond composite sheet cannot be effectively reduced. If the continuous gradient transition layer is too thick, then the thicknesses of the cemented carbide substrate and the diamond layer are reduced accordingly, thereby reducing the wear resistance and cutting efficiency of the composite sheet.

The disclosure also provides a preparation method of a polycrystalline diamond composite sheet having a continuous gradient transition layer by using 3D printing. A diamond micropowder and a binder A are mixed, granulated, and drawn sequentially to obtain a diamond polymer composite filament material. A WC powder, a Co powder, and a binder B are mixed, granulated, and drawn sequentially to obtain a cemented carbide polymer composite filament material. The diamond polymer composite filament material and the cemented carbide polymer composite filament material are put into two feed inlets of a 3D printer respectively. Feeding speeds of the two filament materials are controlled through the feeding system according to a model of the polycrystalline diamond composite sheet so that the two filament materials enter a mixing chamber individually or in different proportions. Then, a polycrystalline diamond composite sheet green body is obtained after being extruded through a nozzle to perform deposition printing. The polycrystalline diamond composite sheet green body is degreased and synthesized under a high temperature and a high pressure to obtain the polycrystalline diamond composite sheet with a gradient structure.

The preparation method of the disclosure controls the feeding speed of two filament materials through the feeding system of a dual-feed single-nozzle FDM printer. When printing the cemented carbide substrate, the system is controlled so that only the cemented carbide polymer composite filament material enters. When printing the polycrystalline diamond layer, the system is controlled so that only the diamond polymer composite filament material enters. When printing the continuous gradient transition layer, the feeding system controls different feeding speeds of the two filament materials to achieve percentage control of the two materials. After being melted at a high temperature, the two filament materials flow into the mixing chamber for mixing through the drainage chamber under the effect of extrusion. After being fully mixed, the two materials are extruded and printed through a single nozzle to perform deposition printing to realize the continuous change of the two materials of diamond and cemented carbide, and the fabrication of the continuous gradient transition layer is completed.

In a preferred solution, the particle size of the diamond micropowder is 1 to 100 μm, the particle size of the WC powder is 100 μm or less, and the particle size of the Co powder is 100 μm or less.

The inventor found that by controlling the particle size of the diamond micropowder and the cemented carbide powder within the above range, the printing accuracy and the performance of the finished product are optimal.

In a preferred solution, a mass ratio of the diamond micropowder and the binder A is 2:1 to 20:1. More preferably, the mass ratio of the diamond micropowder and the binder A is 3:1 to 4:1.

In a preferred solution, a composition of the binder A is, in terms of a mass percentage, as follows: ethylene-vinyl acetate copolymer 20 to 65%, polystyrene 5 to 35%, styrene-butadiene block copolymer 5 to 35%, dodecyltrimethylammonium chloride 3 to 10%, and oleic acid 1 to 5%. More preferably, the composition of the binder A is, in terms of the mass percentage, as follows: ethylene-vinyl acetate copolymer 50 to 65%, polystyrene 25 to 35%, styrene-butadiene block copolymer 15 to 35%, dodecyltrimethylammonium chloride 6 to 10%, and oleic acid 4 to 5%. The raw materials of the binder A are all available on the market. In the composition, for ethylene-vinyl acetate copolymer, the molecular formula is $(C_2H_4)_x(C_4H_6O_2)$ y, and the melting point is 90 to 110° C.; for polystyrene, the molecular formula is $(C_8H_8)n$, and the melting point is 212° C.; for styrene-butadiene block copolymer, CAS is 9003-55-8, and the molecular formula is $C_{36}H_{42}X_2$; for dodecyltrimethylammonium chloride, CAS is: 112-00-5, the molecular formula is $C_{15}H_{34}ClN$, and the melting point is 37° C.; and for oleic acid, the molecular formula is $C_{18}H_{34}O_2$, and the melting point is 13° C.

The binder A of the disclosure uses ethylene-vinyl acetate copolymer as the framework material in the binder. Since short branches formed by polar acetate groups are introduced into the ethylene chain, the original crystallization state is changed, thereby making the ethylene-vinyl acetate copolymer more flexible and elastic, and a good flexibility is given to the filament material. Ethylene-vinyl acetate copolymer can withstand high dosages of fillers and can be blended well with different organic or inorganic compounds. Also, mixing the diamond powder with ethylene-vinyl acetate copolymer can improve the interfacial affinity of the diamond powder, thereby improving the degree of free forming. Polystyrene has advantages such as hard texture, high rigidity, good fluidity, and a broad range of processing temperature and can provide a high strength for composite filament materials. Moreover, the polymer is subjected to shear and high temperature in the internal mixing rotor and extrusion screw, which can maintain the inherent fluidity property thereof. Styrene-butadiene block copolymer is an impact-resistant polymer with a high content of styrene, in which a small amount of butadiene is incorporated into the molecular chain in the form of multiple blocks, which can play a toughening role and give the styrene-butadiene block copolymer a high impact resistance and elongation at break. Dodecyltrimethylammonium chloride is used as a surfactant, and the surfactant can effectively regulate the surface properties and inter-particle interactions of diamond particles and form a monomolecular film on the surface of diamond particles, thereby achieving the effect of modifying the powder surface and improving the compatibility between diamond particles and other polymer materials. The anionic surfactant oleic acid makes the surface of the particles electrostatically charged by adhering to the surface of the particles and prevents the agglomeration of the powder particles through electrostatic repulsion, so that the components in the raw powder material uniformly distributed in the polymer, and the molding performance of the mixture is improved. Under the combined effect of the above-mentioned raw materials of the binder A, the obtained filament material has a good flexibility, fluidity, and uniformity, so that a green body with a uniform performance can be printed.

In a preferred solution, a diameter of the diamond polymer composite filament material is 1.65 to 1.85 mm.

In a preferred solution, a mass ratio of a sum of masses of the WC powder and the Co powder to the binder B is 2:1 to 20:1. More preferably, the mass ratio of the sum of the masses of the WC powder and the Co powder to the binder B is 3:1 to 4:1.

In a preferred solution, a composition of the binder B is, in terms of a mass percentage, as follows: styrene-butadiene block copolymer 30 to 75%, polyurethane 5 to 35%, polyvinyl butyral 5 to 10%, acrylonitrile-butadiene-styrene copolymer 3 to 6%, trimellitate 3 to 6%, and stearic acid 1 to 5%. More preferably, the composition of the binder B is, in terms of the mass percentage, as follows: styrene-butadiene block copolymer 55 to 75%, polyurethane 25 to 35%, polyvinyl butyral 7 to 10%, acrylonitrile-butadiene-styrene copolymer 5 to 6%, trimellitate 4 to 6%, and stearic acid 4 to 5%. The raw materials of the binder B are all available on the market. In the composition, for styrene-butadiene block copolymer, CAS is 9003-55-8, the molecular formula is $C_{36}H_{42}X_2$; for polyurethane, the molecular formula is $(C_{10}H_8N_2O_2 \cdot C_6H_{14}O_3)_x$, and the melting point is 150 to 180° C.; for polyvinyl butyral, the molecular formula is $C_{16}H_{28}O_5$, and the melting point is 165 to 185° C.; for acrylonitrile-butadiene-styrene copolymer, the molecular formula is $C_{45}H_{51}N_3X_2$, and the melting point is 58.54° C.; for trimellitate, CAS is 3319-31-1, and the molecular formula is $C_6H_3(COOR)_3$; and for stearic acid, the molecular formula is $C_{18}H_{36}O_2$, and the melting point is 67 to 72° C.

The inventor found that the styrene-butadiene block copolymer has the solubility and thermoplasticity of polystyrene and the flexibility and resilience of polybutadiene, which can be used as the main component of the cemented carbide polymer composite material, providing a good flexibility of the composite material. Also, styrene-butadiene block copolymer is compatible with many polymers, and adding resin and plasticizer can reduce the melt viscosity thereof. Polyurethane is an organic polymer material, whose molecular backbone consists of flexible long-chain polyols and rigid isocyanate blocks, which can effectively disperse stress. The coexistence of polar and non-polar segments also improves the chemical stability of polyurethane. At the same time, the hydrogen bonding widely existed in the polymer further improves the mechanical properties of the material, which can be used as a framework material to prepare the cemented carbide polymer composite material, complementing the main component styrene-butadiene block copolymer. Polyvinyl butyral is a hot-melt polymer compound, and since the compound has a good cold resistance and adhesion, which has a good adhesion to materials such as metals and ceramics, the bonding effect between the alloy powder and the polymers can be improved. Acrylonitrile-butadiene-styrene copolymer is a thermoplastic polymer material with a high strength, a good toughness, and easy processing and molding, which can achieve the purpose of enhancing the performance of filament material, providing the strength support for the filament material and ensuring that the filament material can smoothly pass through the extrusion gear of the printer and feed into the extrusion nozzle. Trimellitate mainly plays a plasticizing role. The plasticizer molecules are inserted between the polymer molecular chains, weakening the force between the polymer molecular chains. As a result, the mobility of the polymer molecular chains is increased, the crystallinity of the polymer molecular chains is reduced, and thereby the plasticity of the polymer is increased. Therefore, adding trimellitate can improve the plasticity of other polymers. Stearic acid mainly plays a dispersing role and can improve the distribution uniformity of the cemented carbide powder.

In a preferred solution, a diameter of the cemented carbide polymer composite filament material is 1.65 to 1.85 mm.

During the actual operation, a polycrystalline diamond composite sheet model having a continuous gradient transition layer is established in a three-dimensional modeling software in a computer, and the model file is stored in an STL format. Then, a slicing software is used to directly cut the file so that the thickness of each layer has a processability, and the final slicing file is imported into the 3D printing device. Afterward, the two filament materials are put into the feed inlets of the printer respectively, the printer is started, and a polycrystalline diamond composite sheet green body having a continuous gradient transition layer is printed and obtained.

In a preferred solution, a thickness end point of the cemented carbide substrate is set as a gradient starting point and a thickness end point of the continuous gradient transition layer is set as a gradient end point according to the model of the polycrystalline diamond composite sheet. Then, the feeding system is controlled first so that only the cemented carbide polymer composite filament material enters the mixing chamber. When reaching the gradient starting point, according to a thickness of the continuous gradient transition layer, a proportion of the cemented carbide polymer composite filament material entering the mixing chamber is uniformly reduced, a proportion of the diamond polymer composite filament material entering the mixing chamber is uniformly increased, and after the gradient end point is reached, only the diamond polymer composite filament material enters the mixing chamber.

In a preferred solution, during the deposition printing, a gradient starting point is 4 to 13 mm, a gradient end point is 4.1 to 16 mm, a printing layer thickness is 0.05 to 0.3 mm, and a printing speed is 10 to 100 mm/s. More preferably, the printing layer thickness is 0.05 to 0.2 mm, and the printing speed is 10 to 50 mm/s.

In a preferred solution, the degreasing is performed under a vacuum condition, and a vacuum degree is $2.0 \times 10^{-2}$ Pa to $8.0 \times 10^{-4}$ Pa; and a temperature rising process is as the following: raising a temperature from a room temperature to 80° C. to 100° C. at 5 to 15° C./min and maintaining for 0.5 to 1 hour; next, raising the temperature to 180° C. to 230° C. at 3 to 10° C./min and maintaining for 1 to 2.5 hours; then, raising the temperature to 300° C. to 330° C. at 1 to 5° C./min and maintaining for 0.5 to 1.5 hour; and then, raising the temperature to 400° C. to 430° C. at 1 to 5° C./min and maintaining for 0.5 to 1.5 hour; and finally, raising the temperature to 550° C. to 620° C. at 2 to 6° C./min and maintaining for 0.5 to 1 hour, and then finally cooling with a furnace. More preferably, the vacuum degree is $3.0 \times 10^{-3}$ Pa to $8.0 \times 10^{-4}$ Pa; and the temperature rising process is as the following: raising the temperature from the room temperature to 80° C. to 100° C. at 5 to 10° C./min and maintaining for 0.5 to 1 hour; next, raising the temperature to 200° C. to 230° C. at 5 to 10° C./min and maintaining for 1 to 2.5 hours; then, raising the temperature to 300° C. to 330° C. at 1 to 3° C./min and maintaining for 0.5 to 1.5 hour; and then, raising the temperature to 400° C. to 430° C. at 1 to 3° C./min and maintaining for 0.5 to 1.5 hour; and finally, raising the temperature to 550° C. to 620° C. at 3 to 6° C./min and maintaining for 0.5 to 1 hour, and then finally cooling with the furnace.

In the thermal degreasing process of the disclosure, adapted to two different binders in the disclosure, and also based on the difference in the pyrolysis temperature range of different components of the binders, the temperature is raised in a gradient manner for step-by-step degreasing, so as to effectively ensure the completeness of the green body and the elimination effect of the binder in the green body, thereby avoiding degreasing problems such as bulging, cracking, and excessive binder residue.

In a preferred solution, a temperature of the high-temperature and high-pressure synthesis is 1200° C. to 1800° C., a synthesis pressure is 4 to 8 GPa, and a temperature and pressure maintaining time is 100 s to 900 s. More preferably, the temperature of the high-temperature and high-pressure synthesis is 1450° C. to 1550° C., the synthesis pressure is 5.5 to 6 GPa, and the temperature and pressure maintaining time is 200 s to 900 s.

During the actual operation, the printed polycrystalline diamond composite body is put into a metal cup, and the binder in the green body is removed through solvent degreasing and high-temperature degreasing. Then, the degreased metal cup is engaged with a lid cup and put into a synthetic block. The synthetic block is then put into a six-sided/four-sided/two-sided top press for sintering under a condition of a high temperature and a high pressure. After the synthesis is completed, the pressure is slowly released and the temperature is reduced to obtain a polycrystalline diamond composite sheet having a continuous gradient transition layer.

Beneficial Effects

The disclosure provides a polycrystalline diamond composite sheet having a continuous gradient transition layer. Having the continuous gradient transition layer can eliminate the sudden change interface inside the conventional diamond composite sheet, thereby minimizing the stress between layers inside the polycrystalline diamond composite sheet and increasing the bonding strength at the interface between the two materials, and the purpose of optimizing the structure and overall performance is achieved.

The disclosure provides a preparation method of a polycrystalline diamond composite sheet having a continuous gradient transition layer by using 3D printing. This technology can overcome the limitations of conventional processes for making complex structural tools. Through controlling the feeding speeds of the two filament materials by the feeding system of the printer, the continuous change of the two materials, diamond and cemented carbide, are realized, and the fabrication of the continuous gradient transition layer is completed, thereby the production efficiency of the continuous gradient material is significantly improved and the production cost is reduced.

BRIEF DESCRIPTION OF THE DRAWINGS

The FIG. 1s a schematic diagram of a polycrystalline diamond composite sheet having a continuous gradient transition layer.

In the FIGURE, reference numeral 1 is a polycrystalline diamond layer, reference numeral 2 is a continuous gradient transition layer, and reference numeral 3 is a cemented carbide substrate.

DESCRIPTION OF THE EMBODIMENTS

In order to make the content of the disclosure more comprehensible, the disclosure is further described in detail below based on specific embodiments.

Example 1

By design, a thickness of a polycrystalline diamond layer is 2 mm, a thickness of a continuous gradient transition layer is 1 mm, and a thickness of a cemented carbide substrate is 11 mm. A cemented carbide powder used consists of a Co powder of 10% and a WC powder of 90%. A particle size of a diamond micropowder used is 30 μm, and particle sizes of the WC powder and the Co powder is 10 μm or less. A mass ratio of the diamond micropowder and a designated binder A is 3:1. A mass ratio of the cemented carbide powder and a designated binder B is 3:1. In terms of the mass percentage, a composition of raw materials of the designated binder A is: 50% ethylene-vinyl acetate copolymer, 25% polystyrene, 15% styrene-butadiene block copolymer, 6% dodecylt-rimethylammonium chloride, and 4% oleic acid. In terms of the mass percentage, a composition of raw materials of the designated binder B is: 55% styrene-butadiene block copolymer, 25% polyurethane, 7% polyvinyl butyral, 5% acrylonitrile-butadiene-styrene copolymer, 4% trimellinate, and 4% stearic acid.

The example provides a 3D printing manufacturing process for a polycrystalline diamond composite sheet having a continuous gradient transition layer including the following steps.

1) Preparing filament materials for the printing: the diamond micropowder and the designated binder A are put into an internal mixer according to the proportion and mixed to obtain a mixed feed of diamond and polymer. The cemented carbide powder and the designated binder B are put into the internal mixer according to the proportion and mixed to obtain a mixed feed of cemented carbide and polymer. The two kinds of feed materials are put into a granulator in batches for granulation respectively, and then the two kinds of granular materials are put into a wire drawing machine to extrude to respectively obtain a diamond polymer composite filament material and a cemented carbide polymer composite filament material having a diameter of 1.75 mm+0.10 mm.

2) Model and parameter designing for the printing: a model of the polycrystalline diamond composite sheet having a continuous gradient transition layer is drawn on a computer, the model is imported into a slicing software to set printing parameters, and then a printing file is exported. The printing parameters are as the following. A position of a gradient starting point is 11 mm, a position of a gradient end point is 12 mm, a printing layer thickness is 0.2 mm, and a printing speed is 50 mm/s.

3) Green body printing: the print file is imported into the printer, then the two filament materials are put into the feed inlets of the printer respectively. The printer is started to print the polycrystalline diamond composite sheet green body having the continuous gradient transition layer.

4) Green body degreasing: the obtained green body is put into a metal cup, and the designated binder in the green body is removed through solvent degreasing and high temperature degreasing. A vacuum degreasing process is used to remove the designated binder. The green body is put into a vacuum degreasing furnace for thermal degreasing, in which a vacuum degree is $3.0 \times 10^{-3}$ Pa, and a temperature rising process for the degreasing is as the following: first, raising a temperature from 25° C. to 100° C. at 10° C./min and maintaining at 100° C. for 0.5 hour; then raising the temperature from 100° C. to 200° C. at 5° C./min and maintaining at 200° C. for 1 hour; next, raising the temperature from 200° C. to 300° C. at 3° C./min and maintaining at 300° C. for 0.5 hour; then, raising the temperature from 300° C. to 400° C. at 3° C./min and maintaining at 400° C. for 0.5 hour; and finally, raising the temperature from 400° C. to 550° C. at 3° C./min and maintaining at 550° C. for 0.5 h, and then finally cooling in the furnace and a sample is taken out.
5) Assembly: the degreased metal cup is engaged with a lid cup and put into a synthetic block.
6) High temperature and high pressure synthesis: the synthetic block is put into a six-sided top press for sintering under a condition of a high temperature and a high pressure. During the sintering, a synthesis temperature is 1450° C., a synthesis pressure is 5.5 GPa, a total synthesis time is 15 min, and a temperature and pressure maintaining time is for 200 s. After the process is finished, the polycrystalline diamond composite sheet having the continuous gradient transition layer is obtained and taken out from the synthetic block.

After the polycrystalline diamond composite sheet having the continuous gradient transition layer is prepared, a performance thereof is tested. An impact resistance of the PDC sample is tested using the falling weight method, and the impact toughness is measured to be 10.8 KJ. A residual stress is tested using laser Raman spectroscopy, and the residual stress value of an interface between the polycrystalline diamond layer and the transition layer is measured to be 395 MPa. A thermal expansion failure temperature is measured using a thermal expansion meter, and the thermal expansion failure temperature is measured to be 850° C. The above data illustrates that the polycrystalline diamond composite sheet having the continuous gradient transition layer prepared according to the disclosure has a good performance.

Example 2

By design, a thickness of a polycrystalline diamond layer is 2 mm, a thickness of the continuous gradient transition layer is 0.5 mm, and a thickness of a cemented carbide substrate is 11 mm. A cemented carbide powder used consists of a Co powder of 10% and a WC powder of 90%. A particle size of a diamond micropowder used is 30 μm, and particle sizes of the WC powder and the Co powder is 15 μm or less. A mass ratio of the diamond micropowder and a designated binder A is 3:1. A mass ratio of the cemented carbide powder and a designated binder B is 3:1. In terms of the mass percentage, a composition of raw materials of the designated binder A is: 50% ethylene-vinyl acetate copolymer, 25% polystyrene, 15% styrene-butadiene block copolymer, 6% dodecyltrimethylammonium chloride, and 4% oleic acid. In terms of the mass percentage, a composition of raw materials of the designated binder B is: 55% styrene-butadiene block copolymer, 25% polyurethane, 7% polyvinyl butyral, 5% acrylonitrile-butadiene-styrene copolymer, 4% trimellinate, and 4% stearic acid.

The example provides a 3D printing manufacturing process for a polycrystalline diamond composite sheet having a continuous gradient transition layer including the following steps.
1) Preparing filament materials for the printing: the diamond micropowder and the designated binder A are put into an internal mixer according to the proportion and mixed to obtain a mixed feed of diamond and polymer. The cemented carbide powder and the designated binder B are put into the internal mixer according to the proportion and mixed to obtain a mixed feed of cemented carbide and polymer. The two kinds of feed materials are put into a granulator in batches for granulation respectively, and then the two kinds of granular materials are put into a wire drawing machine to extrude to respectively obtain a diamond polymer composite filament material and a cemented carbide polymer composite filament material having a diameter of 1.75 mm+0.10 mm.
2) Model and parameter designing for the printing: a model of the polycrystalline diamond composite sheet having a continuous gradient transition layer is drawn on a computer, the model is imported into a slicing software to set printing parameters, and then a printing file is exported. The printing parameters are as the following. A position of a gradient starting point is 11 mm, a position of a gradient end point is 11.5 mm, a printing layer thickness is 0.25 mm, and a printing speed is 50 mm/s.
3) Green body printing: the print file is imported into the printer, then the two filament materials are put into the feed inlets of the printer respectively. The printer is started to print the polycrystalline diamond composite sheet green body having the continuous gradient transition layer.
4) Green body degreasing: the obtained green body is put into a metal cup, and the designated binder in the green body is removed through solvent degreasing and high temperature degreasing. A vacuum degreasing process is used to remove the designated binder. The green body is put into a vacuum degreasing furnace for thermal degreasing, in which a vacuum degree is $3.0 \times 10^{-3}$ Pa, and a temperature rising process for the degreasing is as the following: first, raising a temperature from 25° C. to 100° C. at 10° C./min and maintaining at 100° C. for 0.5 hour; then raising the temperature from 100° C. to 200° C. at 5° C./min and maintaining at 200° C. for 1 hour; next, raising the temperature from 200° C. to 300° C. at 3° C./min and maintaining at 300° C. for 0.5 hour; then, raising the temperature from 300° C. to 400° C. at 3° C./min and maintaining at 400° C. for 0.5 hour; and finally, raising the temperature from 400° C. to 550° C. at 3° C./min and maintaining at 550° C. for 0.5 h, and then finally cooling in the furnace and a sample is taken out.
5) Assembly: the degreased metal cup is engaged with a lid cup and put into a synthetic block.
6) High temperature and high pressure synthesis: the synthetic block is put into a six-sided top press for sintering under a condition of a high temperature and a high pressure. During the sintering, a synthesis temperature is 1450° C., a synthesis pressure is 5.5 GPa, a total synthesis time is 15 min, and a temperature and pressure maintaining time is for 200 s. After the process is finished, the polycrystalline diamond composite sheet having the continuous gradient transition layer is obtained and taken out from the synthetic block.

After the polycrystalline diamond composite sheet having the continuous gradient transition layer is prepared, a performance thereof is tested. An impact resistance of the PDC sample is tested using the falling weight method, and the impact toughness is measured to be 11.8 KJ. A residual stress is tested using laser Raman spectroscopy, and the residual stress value of an interface between the polycrystalline diamond layer and the transition layer is measured to be 215 MPa. A thermal expansion failure temperature is measured using a thermal expansion meter, and the thermal expansion failure temperature is measured to be 865° C. The above data illustrates that the polycrystalline diamond composite sheet having the continuous gradient transition layer prepared according to the disclosure has a good performance.

Example 3

By design, a thickness of a polycrystalline diamond layer is 2 mm, a thickness of a continuous gradient transition layer is 1 mm, and a thickness of a cemented carbide substrate is 11 mm. A cemented carbide powder used consists of a Co powder of 10% and a WC powder of 90%. A particle size of a diamond micropowder used is 30 μm, and particle sizes of the WC powder and the Co powder is 20 μm or less. A mass ratio of the diamond micropowder and a designated binder A is 4:1. A mass ratio of the diamond micropowder and a designated binder B is 4:1. In terms of the mass percentage, a composition of raw materials of the designated binder A is: 50% ethylene-vinyl acetate copolymer, 25% polystyrene, 15% styrene-butadiene block copolymer, 6% dodecyltrimethylammonium chloride, and 4% oleic acid. In terms of the mass percentage, a composition of raw materials of the designated binder B is: 55% styrene-butadiene block copolymer, 25% polyurethane, 7% polyvinyl butyral, 5% acrylonitrile-butadiene-styrene copolymer, 4% trimellinate, and 4% stearic acid.

The example provides a 3D printing manufacturing process for a polycrystalline diamond composite sheet having a continuous gradient transition layer including the following steps.

1) Preparing filament materials for the printing: the diamond micropowder and the designated binder A are put into an internal mixer according to the proportion and mixed to obtain a mixed feed of diamond and polymer. The cemented carbide powder and the designated binder B are put into the internal mixer according to the proportion and mixed to obtain a mixed feed of cemented carbide and polymer. The two kinds of feed materials are put into a granulator in batches for granulation respectively, and then the two kinds of granular materials are put into a wire drawing machine to extrude to respectively obtain a diamond polymer composite filament material and a cemented carbide polymer composite filament material having a diameter of 1.75 mm+0.10 mm.
2) Model and parameter designing for the printing: a model of the polycrystalline diamond composite sheet having a continuous gradient transition layer is drawn on a computer, the model is imported into a slicing software to set printing parameters, and then a printing file is exported. The printing parameters are as the following. A position of a gradient starting point is 11 mm, a position of a gradient end point is 12 mm, a printing layer thickness is 0.2 mm, and a printing speed is 50 mm/s.
3) Green body printing: the print file is imported into the printer, then the two filament materials are put into the feed inlets of the printer respectively. The printer is started to print the polycrystalline diamond composite sheet green body having the continuous gradient transition layer.
4) Green body degreasing: the obtained green body is put into a metal cup, and the designated binder in the green body is removed through solvent degreasing and high temperature degreasing. A vacuum degreasing process is used to remove the designated binder. The green body is put into a vacuum degreasing furnace for thermal degreasing, in which a vacuum degree is $3.0 \times 10^{-3}$ Pa, and a temperature rising process for the degreasing is as the following: first, raising a temperature from 25° C. to 100° C. at 10° C./min and maintaining at 100° C. for 0.5 hour; then raising the temperature from 100° C. to 200° C. at 5° C./min and maintaining at 200° C. for 1 hour; next, raising the temperature from 200° C. to 300° C. at 3° C./min and maintaining at 300° C. for 0.5 hour; then, raising the temperature from 300° C. to 400° C. at 3° C./min and maintaining at 400° C. for 0.5 hour; and finally, raising the temperature from 400° C. to 550° C. at 3° C./min and maintaining at 550° C. for 0.5 h, and then finally cooling in the furnace and a sample is taken out.
5) Assembly: the degreased metal cup is engaged with a lid cup and put into a synthetic block.
6) High temperature and high pressure synthesis: the synthetic block is put into a six-sided top press for sintering under a condition of a high temperature and a high pressure. During the sintering, a synthesis temperature is 1550° C., a synthesis pressure is 6 GPa, a total synthesis time is 18 min, and a temperature and pressure maintaining time is for 200 s. After the process is finished, the polycrystalline diamond composite sheet having the continuous gradient transition layer is obtained and taken out from the synthetic block.

After the polycrystalline diamond composite sheet having the continuous gradient transition layer is prepared, a performance thereof is tested. An impact resistance of the PDC sample is tested using the falling weight method, and the impact toughness is measured to be 12.1 KJ. A residual stress is tested using laser Raman spectroscopy, and the residual stress value of an interface between the polycrystalline diamond layer and the transition layer is measured to be 185 MPa. A thermal expansion failure temperature is measured using a thermal expansion meter, and the thermal expansion failure temperature is measured to be 872° C. The above data illustrates that the polycrystalline diamond composite sheet having the continuous gradient transition layer prepared according to the disclosure has a good performance.

Comparative Example 1

Other conditions are the same as Example 1, while the thickness of the continuous gradient transition layer is designed to be 0.05 mm. Since the continuous gradient transition layer is too thin and the material transition interval is small, the residual stress inside the diamond composite sheet cannot be effectively reduced, and the residual stress value reaches 795 MPa.

Comparative Example 2

Other conditions are the same as Example 2, while the vacuum degree during the degreasing process is-0.08 MPa. The degreased green body taken out is significantly oxidized, which directly affects the synthesis effect of the diamond composite sheet. In the synthesized polycrystalline diamond composite sheet, phenomena such as dents and falling edges occur.

Comparative Example 3

Other conditions are the same as Example 3, while the synthesis pressure is set to 3.5 GPa. Since the sintering pressure is low, the sintering for the polycrystalline diamond layer is not completed. After the sample was taken out and sandblasted, the polycrystalline diamond layer fell off directly, and a qualified polycrystalline diamond composite sheet cannot be obtained.

Therefore, the above descriptions are only preferred embodiments of the present disclosure, and are not intended to limit the present disclosure. For those skilled in the art, the present disclosure may have various modifications and changes. Any modification, equivalent replacement, improvement, etc. made within the spirit and principle of the present disclosure shall be included within the scope of the present disclosure.

What is claimed is:

1. A preparation method of a polycrystalline diamond composite sheet having a continuous gradient transition layer, comprising:
    mixing, granulating, and drawing sequentially a diamond micropowder and a binder A to obtain a diamond polymer composite filament material, wherein a particle size of the diamond micropowder is 1 to 100 μm;
    mixing, granulating, and drawing sequentially a WC powder, a Co powder, and a binder B to obtain a cemented carbide polymer composite filament material;
    putting the diamond polymer composite filament material and the cemented carbide polymer composite filament material into two feed inlets of a 3D printer respectively;
    controlling a feeding speed of the diamond polymer composite filament material and a feeding speed of the cemented carbide polymer composite filament material through a feeding system according to a model of the polycrystalline diamond composite sheet so that the diamond polymer composite filament material and the cemented carbide polymer composite filament material enter a mixing chamber individually or in different proportions;
    obtaining a polycrystalline diamond composite sheet green body after being extruded through a nozzle to perform deposition printing; and
    performing degreasing and synthesizing under a temperature of 1200° C. to 1800° C. and a pressure of 4 to 8 GPa on the polycrystalline diamond composite sheet green body to obtain the polycrystalline diamond composite sheet with a gradient structure,
    wherein the polycrystalline diamond composite sheet consists of a polycrystalline diamond layer, the continuous gradient transition layer, and a cemented carbide substrate from top to bottom, wherein the continuous gradient transition layer consists of diamond and cemented carbide, a content of the cemented carbide in the continuous gradient transition layer decreases from 100% to 0, and a content of the diamond increases from 0 to 100%, along a direction from the cemented carbide substrate to the polycrystalline diamond layer,
    wherein a mass ratio of the diamond micropowder and the binder A is 2:1 to 20:1;
    a composition of the binder A is, in terms of a mass percentage, as follows: 20 to 65% of ethylene-vinyl acetate copolymer, 5 to 35% of polystyrene, 5 to 35% of styrene-butadiene block copolymer, 3 to 10% of dodecyltrimethylammonium chloride, and 1 to 5% of oleic acid; and
    a diameter of the diamond polymer composite filament material is 1.65 to 1.85 mm.

2. The preparation method of the polycrystalline diamond composite sheet having the continuous gradient transition layer as claimed in claim 1, wherein
    a mass ratio of a sum of masses of the WC powder and the Co powder to the binder B is 2:1 to 20:1;
    a composition of the binder B is, in terms of a mass percentage, as follows: 30 to 75% of styrene-butadiene block copolymer, 5 to 35% of polyurethane, 5 to 10% of polyvinyl butyral, 3 to 6% of acrylonitrile-butadiene-styrene copolymer, 3 to 6% of trimellitate, and 1 to 5% of stearic acid;
    a diameter of the cemented carbide polymer composite filament material is 1.65 to 1.85 mm.

3. The preparation method of the polycrystalline diamond composite sheet having the continuous gradient transition layer as claimed in claim 1, comprising:
    setting a thickness end point of the cemented carbide substrate as a gradient starting point and setting a thickness end point of the continuous gradient transition layer as a gradient end point according to the model of the polycrystalline diamond composite sheet;
    controlling the feeding system first so that only the cemented carbide polymer composite filament material enters the mixing chamber,
    when reaching the gradient starting point, a proportion of the cemented carbide polymer composite filament material entering the mixing chamber decreases uniformly, and a proportion of the diamond polymer composite filament material entering the mixing chamber increases uniformly, according to a thickness of the continuous gradient transition layer; and
    after the gradient end point is reached, only the diamond polymer composite filament material enters the mixing chamber.

4. The preparation method of the polycrystalline diamond composite sheet having the continuous gradient transition layer as claimed in claim 3, wherein during the deposition printing, a position of the gradient starting point is 4 to 13 mm from a bottom of the cemented carbide substrate, a position of the gradient end point is 4.1 to 16 mm from the bottom of the cemented carbide substrate, a printing layer thickness is 0.05 to 0.3 mm, and a printing speed is 10 to 100 mm/s.

5. The preparation method of the polycrystalline diamond composite sheet having the continuous gradient transition layer as claimed in claim 1, wherein the degreasing is performed under a vacuum condition, and a vacuum degree is $2.0 \times 10^{-2}$ Pa to $8.0 \times 10^{-4}$ Pa; and a temperature rising process is as the following: first, raising a temperature from a room temperature to 80° C. to 100° C. at 5 to 15° C./min and maintaining for 0.5 to 1 hour; next, raising temperature to 180° C. to 230° C. at 3 to 10° C./min and maintaining for 1 to 2.5 hours; then, raising temperature to 300° C. to 330° C. at 1 to 5° C./min and maintaining for 0.5 to 1.5 hour; and then, raising temperature to 400° C. to 430° C. at 1 to 5° C./min and maintaining for 0.5 to 1.5 hour; and finally, raising temperature to 550° C. to 620° C. at 2 to 6° C./min and maintaining for 0.5 to 1 hour, and then finally cooling with a furnace.

6. The preparation method of the polycrystalline diamond composite sheet having the continuous gradient transition layer as claimed in claim 1, wherein during the synthesizing, a temperature and pressure maintaining time is 100 s to 900 s.

* * * * *